Dec. 29, 1959 H. M. AUGSBURGER 2,919,297
MEANS OF CONTROLLING ELECTRIC CURRENTS IN A FURNACE FOREHEARTH
Filed April 18, 1957 2 Sheets-Sheet 1
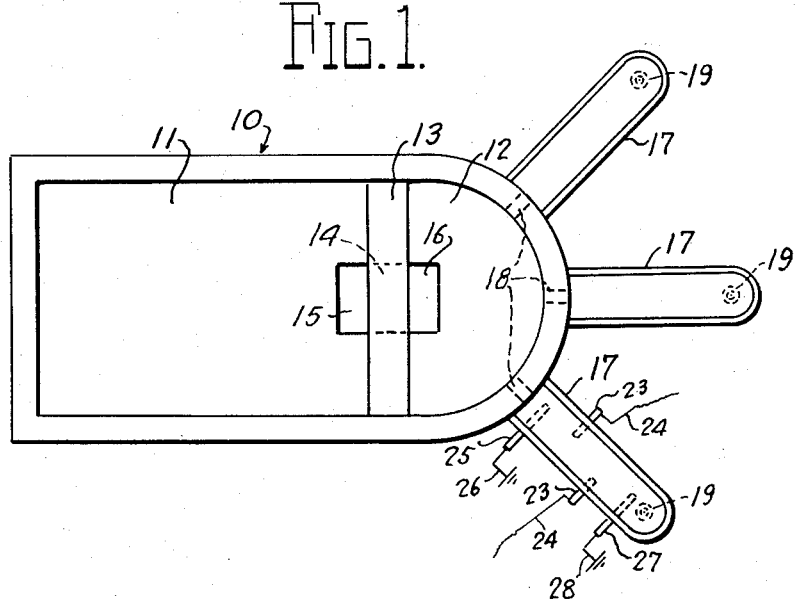
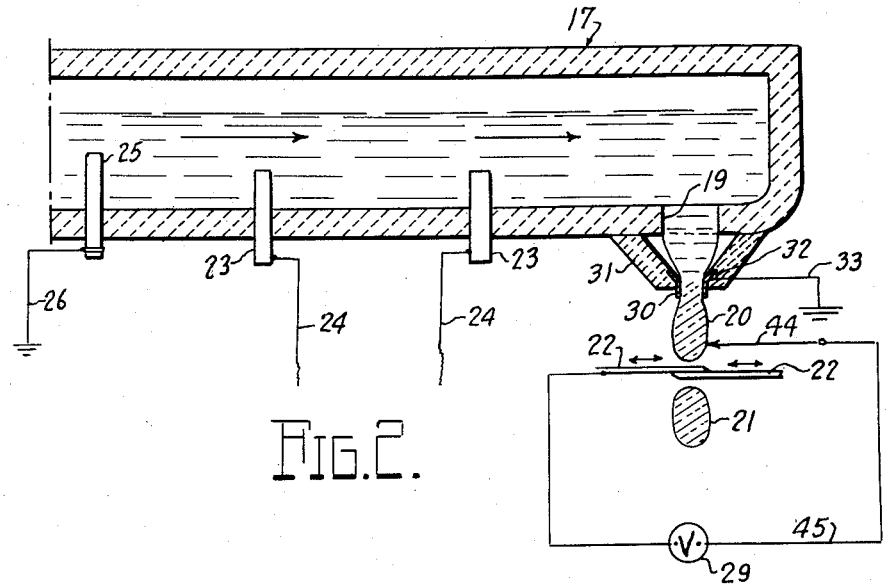
INVENTOR.
Herbert M. Augsburger
BY
J. R. Nelson &
Leonard D. Soubier
ATTORNEYS

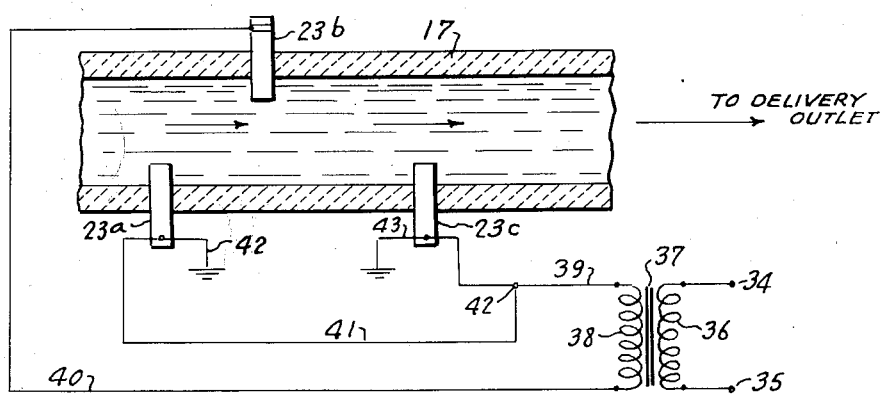
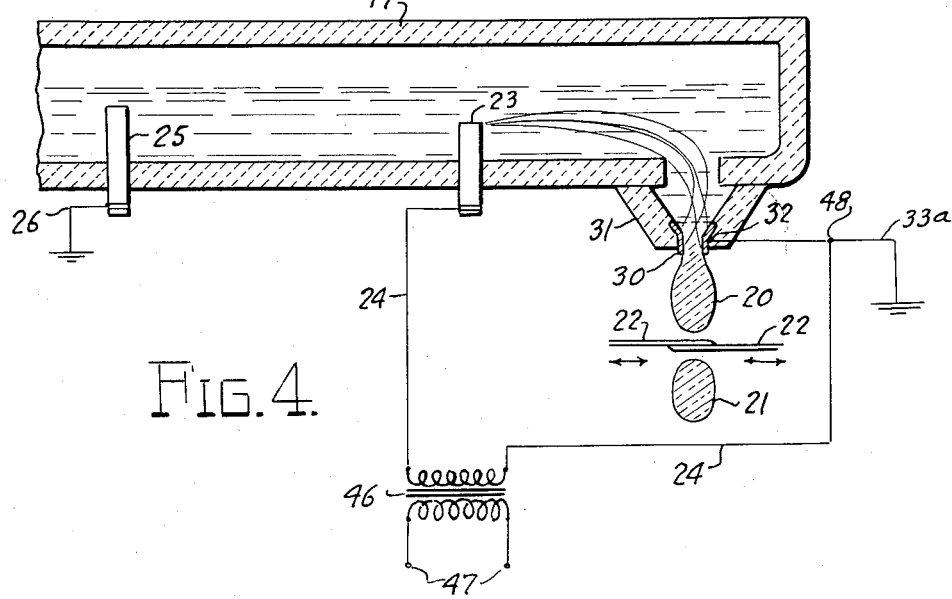

United States Patent Office 2,919,297
Patented Dec. 29, 1959

2,919,297

MEANS OF CONTROLLING ELECTRIC CURRENTS IN A FURNACE FOREHEARTH

Herbert M. Augsburger, Sylvania, Ohio, assignor to Owens-Illinois Glass Company, a corporation of Ohio Application April 18, 1957, Serial No. 653,616

8 Claims. (Cl. 13—6)

This invention relates to feeder forehearths of a glass melting furnace employing electric heating, and more particularly to method and apparatus for preventing electric current flow to the refining zone or to the glass being withdrawn from the forehearth.

In a glass manufacturing furnace, electric heating in the forehearth or working area of the furnace is desirable to condition the glass while it is retained in that area prior to feeding it to the forming machinery. The electric heating is generally obtained by the Joule effect of electric current passing through the glass between electrodes immersed in the glass in the forehearth. In so doing, the electric currents need be controlled to prevent an electric potential from appearing on the glass that is being fed to prevent the following: (1) inaccuracy by instrumentation effect on the thermocouple controls for the refiner or forehearth, (2) defects in the delivered glass by arcing at the delivery equipment, such as at the shears, rollers, gathering rams, blow pipes, Danner machine noses, electricity conducting skimmers or stirrers, which ever equipment is being used, and (3) a glass defect in the delivered charge by non-uniform heating in a localized area thereof.

It is, therefore, an object of the present invention to provide method and apparatus for controlling the electric currents present in a forehearth having applied therein Joule effect electric heating to confine the electric currents away from the entrance to the forehearth from the refiner and away from the point of delivery of the glass.

Another object of the present invention is to provide grounding electrodes in the forehearth between the glass entrance and the adjacent energized electrodes and between the point of delivery and the adjacent energized electrodes.

The specific nature of this invention, as well as other objects and advantages thereof, will become apparent to those skilled in the art from the following detailed description, taken in conjunction with the annexed sheet of drawings on which, by way of preferred example only, are illustrated several embodiments of this invention.

On the drawings:

Fig. 1 is a plan view of a glass manufacturing furnace having melting, refining and three working zones, one of the working zones or forehearths being provided with energized electrodes and illustrates a form of the present invention.

Fig. 2 is a sectional elevational view of a working zone or forehearth section of Fig. 1, and illustrates a second form of the invention.

Fig. 3 is a fragmentary plan view of a working zone or forehearth section of Fig. 1, and illustartes a third form of the invention.

Fig. 4 is a sectional elevational view of a forehearth section, similar to Fig. 2, illustrating a fourth form of the invention.

In Fig. 1, a glass furnace, referred to generally at 10, comprises a melting chamber 11 and refining chamber 12 separated by a suitable partition wall 13. Melting chamber 11 is connected to refining chamber 12 by a submerged throat passage 14. Glass is melted to a molten state in melting chamber 11 and enters throat inlet 15, flows through throat passage 14, and into refining chamber 12 at throat outlet 16.

The glass is fused and melted in melting chamber 11 by heat supplied by combustion of gaseous fuels or Joule effect of electric current passed through the glass or the combination of both. Either method of heating is generally well known, and is, therefore, not shown on the drawings.

The glass body contained in refining chamber 12 is subjected to further conditioning to refine it after delivery from melting chamber 11. The glass is then flowed by gravity to working zones represented by forehearths 17. This glass enters forehearths 17 through entrance passages 18 at the adjacent end of forehearth 17. The forehearth 17 takes the form of a glass carrying channel or enclosure and the received glass entering passage 18 is at an elevation above the delivery outlet 19, which will be presently described, so that the glass flows in a stream through the forehearth by gravity.

Referring for a moment to Fig. 2, we see that at a point along the bottom of forehearth 17 is a delivery outlet 19 through which the glass is fed in a continuous stream 20 and severed into working charges or gobs 21 by a pair of reciprocating shears 22 timed for reciprocation to measure the appropriate gob size.

Again referring to Fig. 1, the glass, while in forehearth 17, is conditioned by further heating applied by Joule effect of electrodes 23 inserted in the walls of forehearth 17 and immersed in the glass therein contained. Electrodes 23 are connected into a power circuit 24 containing an energizing source of electric power (not shown). Electrodes 23, although shown as a pair, may be any number connected into a power circuit having a source of one or more phases of electric power. The heat thus applied by the electrodes controls the cooling of the glass and conditions it to the desired working temperature. In some cases, ingredients may be added to the glass in forehearth 17, in which case the electric heating is utilized to fuse and mix the added ingredients into the glass in a homogeneous mixture prior to delivery in working charges.

The current flow between electrodes 23 may result in stray currents passing through the glass and into the body of glass in refining chamber 12 causing the aforementioned instrumentation effect on the thermocouples and electrical temperature controls of the furnace. Perhaps a more serious problem is created if these stray currents flow through the glass that is being fed at the delivery outlet, thereby affecting the working charges by arcing at the reciprocating shears.

This invention is directed at eliminating these harmful electrical currents in the glass by the following. Ground electrode 25 is inserted through the wall of forehearth 17 and immersed in the flowing glass near entrance passage 18 to forehearth 17 and is located upstream of the energized electrodes 23 intermediate electrodes 23 and passage 18. Electrode 25 has a ground connection 26, so that stray electric currents in the glass in forehearth 17 flowing toward refining chamber 12 will be diverted through electrode 25 to ground. Thus, they are prevented from entering refining chamber 12 or the other forehearths 17. Ground electrode 27 is similarly inserted through the wall of forehearth 17 downstream of the energized electrodes 23 intermediate electrodes 23 and delivery outlet 19. Electrode 27 has a ground connection 28, so that stray electric currents in the glass in forehearth 17 that flow toward delivery outlet 19 will be diverted through electrode 27 to ground and be prevented from affecting the working charges formed by shears 22.

As shown in Fig. 2, the effectiveness of ground electrode 27 may be measured by connecting an electric current measuring device, such as voltmeter 29, across one of the reciprocating shears 22 and the glass gob 20 to detect any current flow from the glass stream 20 into shears 22 at the time of forming the working charges or gobs 21. This measurement may be made periodically by engaging stream 20 with a rod 44 of electricity conducting material, such as platinum, at a point between shears 22 and annular orifice member 30. Rod 44 is connected to one side of voltmeter 29 by a conductor wire 45. If a reading registers on voltmeter 29, it indicates that electrode 27 is not effectively grounded. A similar measuring electrical device may be connected across the entrance passage 18 of forehearth 17, to determine the effectiveness of the ground connection at electrode 25.

In the above described embodiment, it may be desirable to have but one of forehearths 17 provided with electric heating for feeding it to a different forming operation than at the other feeder forehearths. In this case, the effectiveness of the ground at electrode 26 may be measured by applying a voltmeter hook up, such as 29, to the shears of those forehearths that are not electrically heated. Currents flowing through the refining chamber will show up on the glass fed to the shears at the other forehearths.

In Fig. 2, a second embodiment of the invention is illustrated, which will now be described.

Forehearth 17 is constructed, as previously described, having energized electrodes 23 and grounded electrode 26 similarly located. However, in place of grounded electrode 27, an annular member 30 is provided on funnel member 31 of delivery outlet 19. Annular member 30 is constructed of an electricity conducting material such as for example a platinum-rhodium alloyed material, instead of the conventional refractory construction of funnel member 31 which supports it. A terminal point 32 on annular member 30 is connected to ground by insulated wire 33. Wire 33 passes through radial bore 34 in funnel member 31 in register with terminal point 32 to permit making the ground connection. The glass stream 20 is guided by and is continuously in contact with annular member 30 during delivery of the glass from forehearth 17.

Referring now to Fig. 3, a third embodiment of the invention will now be described.

An intermediate portion of forehearth 17 between entrance passage 18 and delivery outlet 19 (Fig. 1) is provided with electrodes 23a, 23b and 23c (Fig. 3). Power to energize these electrodes is supplied from main line supply lines 34 and 35 connected to the primary windings 36 of transformer 37. Electrodes 23c and 23b are connected across secondary windings 38 of transformer 37 by lines 39 and 40, respectively. A second connection across secondary windings 38 is made between electrode 23a by line 41 connected to line 39 at junction 42 and electrode 23b and line 40. Electrode 23a, which is the electrode of the group nearest the entrance passage 18 (Fig. 1) where glass enters forehearth 17, is connected to ground by wire 42 (Fig. 3). Similarly, electrode 23c, which is the electrode nearest the delivery outlet 19 (Fig. 1), is connected to ground by wire 43 (Fig. 3). The two ground wires make an electrical connection between electrodes 23a and 23c, but more importantly these two electrodes serve as grounding electrodes for stray electric currents to prevent them from appearing on the glass being delivered or the glass in the body thereof in the refining chamber and other forehearths, as previously described.

In Fig. 4, the fourth embodiment of the invention employs a forehearth 17 feeding a stream of glass 20 through delivery outlet 19 past a reciprocating pair of opposed shears 22 for severing gobs 21 from stream 22. The funnel member 31 in underlying alignment with delivery outlet 19 is provided with an annular lining member 30, as previously described in conjunction with Fig. 2. The terminal point 32 is connected to power circuit 24 which is energized with transformed electric power in transformer 46 received from a main line power supply 47. Power circuit 24 is closed by a connection to electrode 23 which is located upstream of delivery outlet 19 in forehearth 17. Current flows through the glass to stream 20 between lining member 30, which serves as an electrode, and electrode 23 and supplies heat to the glass undergoing withdrawal by Joule effect.

Also connected to lining member 30 at junction 48 in power circuit 24 is ground connection 33a. This ground connection neutralizes the current in stream 20 upon its exit from the furnace.

Upstream of electrode 23 at a distance greater than the distance to lining member 30, is a grounded electrode 25 connected to ground by line 26. Stray currents in the glass flowing toward the refining chamber are thus grounded, as previously described.

In the embodiments of this invention herein described it should be understood that glass entering the forehearth or working zone of the furnace flows therethrough for delivery at a point spaced along the forehearth and reference to "upstream," used herein, is intended to mean the direction toward the point at which glass enters the forehearth and "downstream," used herein, is intended to mean the direction toward the point at which glass is delivered from the forehearth. The glass received and conditioned in the forehearth may be fed for delivery through an orifice or gathered as working charges by a gathering ram dipped into a boot. The term "delivery outlet," used herein, is therefore intended to encompass delivery of the glass either at an outlet orifice or a boot for gathering glass for removal as charges by a gathering ram cooperating therewith.

It will, of course, be understood that various other details may be modified through a wide range without departing from the principles of this invention, and it is, therefore, not the purpose to limit the patent granted hereon otherwise than necessitated by the scope of the appended claims.

I claim:

1. In a feeder forehearth for a glass melting furnace having a delivery outlet therein, said forehearth connected at one end to a body of refined glass and receiving said glass therefrom and discharging it at the said delivery outlet, the combination of: electric heating means comprising a plurality of energized electrodes inserted in one or more walls of said forehearth and submerged in the glass therein for heating said glass by Joule effect of electric current passed therethrough between said electrodes, a first grounded electrode submerged in said glass in the forehearth intermediate its glass entrant end and the nearest electrode thereto of said electric heating means, and a second grounded electrode intermediate the point of delivery at said delivery outlet and the nearest electrode thereto of said electric heating means.

2. The forehearth combination defined in claim 1, wherein said second grounded electrode is located in the delivery outlet.

3. The forehearth combination defined in claim 2, wherein said delivery outlet comprises an orifice opening through said forehearth and said second grounded electrode comprises an annular lining of electricity conducting material in said orifice, and an electric connection between a point on said annular lining and ground.

4. In a feeder forehearth for a glass melting furnace having a delivery outlet therein, said forehearth connected at one of its ends to a body of refined glass and receiving said glass therefrom and discharging at the said delivery outlet, the combination of: electric heating means comprising at least three electrodes inserted in one or more walls of said forehearth and submerged in the glass therein contained, one of said electrodes being nearer the glass entrance end of said forehearth than any of the other said electrodes and another of said other electrodes being nearer the said delivery outlet than any of the other electrodes, and means for connecting said electrodes which are nearest the glass receiving end and delivery outlet of said forehearth respectively to ground.

5. A glass furnace forehearth for feeding and conditioning glass received from a body thereof, said received glass having a viscosity to permit flow in said forehearth by gravity, comprising glass carrying means connecting the body of glass in said furnace to said forehearth for flow of glass into said forehearth, outlet means in said forehearth for withdrawing glass therefrom, said outlet means being disposed downstream in said forehearth whereby said glass will flow through said forehearth to said outlet means, a plurality of energized electrodes in contact with the stream of glass flowing in said forehearth and disposed intermediate said glass carrying means and said outlet means, said electrodes providing passage of current therebetween through said glass for adding heat to it by Joule effect of said current, a first grounded electrode in contact with said stream of glass in said forehearth and upstream from said energized electrodes, and a second ground electrode in contact with said stream of glass and downstream from said energized electrodes.

6. A glass furnace forehearth for feeding and conditioning glass received from a body thereof, said received glass having a viscosity to permit flow in said forehearth by gravity, comprising glass carrying means connecting the body of glass in said furnace to said forehearth for flow of glass into said forehearth, outlet means in said forehearth for withdrawing glass therefrom, said outlet means being disposed downstream from said glass carrying means whereby said glass will flow through said forehearth to said outlet means, a plurality of energized electrodes in contact with the stream of glass flowing in said forehearth and disposed intermediate said glass carrying means and said outlet means, said electrodes providing passage of current therebetween through said glass for adding heat to it by Joule effect of said current, said electrodes being disposed to contact said stream of glass in such a manner that one of said electrodes is upstream from the other said electrodes and another of said electrodes is downstream from the other said electrodes, and means connecting said upstream and downstream electrodes each to ground.

7. In a feeder forehearth for a glass melting furnace and having a delivery outlet therein, said forehearth connected at one end to a body of refined glass and receiving said glass therefrom and discharging it at said delivery outlet, the combination of: at least one electrode in said forehearth and submerged in the glass therein spaced from said delivery outlet, said electrodes being located nearer the delivery outlet end of said forehearth than the glass receiving end thereof, an annular electrode member in contact with glass passing through the delivery outlet, a power circuit electrically connecting said electrodes and said annular electrode member, a source of electrical power energizing said power circuit for heating the glass by Joule effect of electric current passed between said electrodes and said annular electrode member, an electrical connection between said annular electrode member and ground, and a grounded electrode in said forehearth upstream from said electrodes in the forehearth and spaced therefrom by a distance greater than the distance from the said electrodes in the power circuit to the delivery outlet.

8. In a glass furnace for melting, refining, conditioning, and feeding glass, the combination of: at least one chamber adapted to convey molten glass therethrough by gravity flow, said chamber being connected to receive molten glass from a body thereof contained in a separate chamber upstream from the first-mentioned chamber and discharging said received glass to a delivery outlet, electric heating means in said first-mentioned chamber, said means including a plurality of energized electrodes inserted in one or more walls of that chamber and submerged in the glass flowing therethrough for heating said glass by Joule effect of electric current passed between said electrodes, a first grounded electrode submerged in the glass in said first-mentioned chamber intermediate its glass receiving point and the nearest electrode thereto of said heating means, and a second grounded electrode intermediate the point of delivery of said glass at the delivery outlet and the nearest electrode thereto of said electric heating means, whereby all electric currents applied to the glass by said heating means are confined within said first-mentioned chamber.

References Cited in the file of this patent

UNITED STATES PATENTS

| 1,999,744 | Wadman | Apr. 30, 1935 |
| 2,276,295 | Ferguson | Mar. 17, 1942 |
| 2,710,306 | Penberthy | June 7, 1944 |
| 2,790,019 | Stalego | Apr. 23, 1957 |